(12) United States Patent
Ebihara

(10) Patent No.: US 9,036,938 B2
(45) Date of Patent: May 19, 2015

(54) IMAGE PROCESSING APPARATUS, IMAGE PROCESSING METHOD, AND PROGRAM

(71) Applicant: Sony Corporation, Tokyo (JP)

(72) Inventor: Masakazu Ebihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 222 days.

(21) Appl. No.: 13/867,364

(22) Filed: Apr. 22, 2013

(65) Prior Publication Data

US 2013/0315500 A1     Nov. 28, 2013

(30) Foreign Application Priority Data

May 23, 2012  (JP) .................................. 2012-117386

(51) Int. Cl.
*G06T 5/00* (2006.01)

(52) U.S. Cl.
CPC ................. *G06T 5/003* (2013.01); *G06T 5/002* (2013.01); *G06T 2207/20012* (2013.01)

(58) Field of Classification Search
CPC .................... G06T 2207/20012; G06T 5/002; G06T 5/003
See application file for complete search history.

(56) References Cited

U.S. PATENT DOCUMENTS

| | | | |
|---|---|---|---|
| 5,621,868 A | | 4/1997 | Mizutani et al. |
| 6,011,536 A | * | 1/2000 | Hertzmann et al. ........... 345/418 |
| H2003 H | * | 11/2001 | Minner ......................... 382/254 |
| 6,714,207 B2 | * | 3/2004 | Asente ........................... 345/593 |
| 7,969,477 B2 | * | 6/2011 | Silverbrook ............... 348/222.1 |
| 2004/0117561 A1 | * | 6/2004 | Quach et al. .................. 711/146 |
| 2011/0187732 A1 | | 8/2011 | Odagiri |
| 2012/0050769 A1 | * | 3/2012 | Houjou et al. ................. 358/1.9 |
| 2012/0057748 A1 | * | 3/2012 | Katano ......................... 382/103 |
| 2013/0058580 A1 | * | 3/2013 | Wakazono ................... 382/201 |

FOREIGN PATENT DOCUMENTS

JP    2011-160306    8/2011

\* cited by examiner

*Primary Examiner* — Jingge Wu
(74) *Attorney, Agent, or Firm* — Oblon, McClelland, Maier & Neustadt, L.L.P.

(57) ABSTRACT

There is provided an image processing apparatus including a vector detection unit which detects flow vectors of pixels in an inputted image, a vector-coherency calculation unit which calculates vector coherency based on the flow vectors detected by the vector detection unit, a deformation-characteristic computation unit which computes a deformation characteristic by using the vector coherency calculated by the vector-coherency calculation unit, the deformation characteristic being used for deforming a tap shape of a filter used for each of the pixels, and a painterly conversion unit which converts the inputted image based on the deformation characteristic computed by the deformation-characteristic computation unit.

11 Claims, 16 Drawing Sheets

OBTAIN DISTRIBUTION OF
VECTORS IN CERTAIN
NEIGHBORHOOD RANGE

IMAGE PROCESSING APPARATUS, IMAGE PROCESSING METHOD, AND PROGRAM

BACKGROUND

The present disclosure relates to an image processing apparatus, an image processing method, and a program, and particularly relates to an image processing apparatus, an image processing method, and a program which are designed to make it possible to locally obtain a painterly effect in an image in one process.

In related art, there is well known LPF (Low-pass filter) processing performed for eliminating noise in image data. However, diversified needs in recent years lead to development of a special LPF by which an edge is retained for enhancing contrast, as represented by a bilateral filter, and further to development of a painterly filter and the like to which the LPF is applied.

The painterly filter is a technique of converting an inputted image into a painterly image as an outputted image. Such a technique is referred to as Non Photorealistic Rendering (NPR). As the NPR technique, the following techniques are known by which images having textures like a watercolor and an oil painting are obtained. To obtain a texture like a watercolor, smoothing is performed while retaining edges by using the bilateral filter or a kuwahara filter. To obtain a texture like an oil painting, an image is provided with a pattern similar to paintbrush strokes.

For example, JP H8-44867A (U.S. Pat. No. 5,621,868A) describes algorithm by which an outputted image like an oil painting is obtained by generating a pattern similar to paintbrush strokes by repeating a process of replacing values of pixels surrounding the center pixel in a certain oval region in an inputted image with a value of the center pixel. Note that this technique uses monotonous textures of generated strokes, and thus achieves only, a small number of painting styles.

In contrast, A. Hertzmann, "Painterly Rendering with Curved Brush Strokes of Multiple Sizes," Proc. Sgigraph 98, ACM Press, 1998, pp. 453-460 (Non-patent Document 1) proposes algorithm by which a squared error between an inputted image and an outputted image is made smaller and smaller by repeating drawing a brush pattern on an outputted image, so that an outputted image like an oil painting is obtained. This technique can change the painting style of the outputted image by changing the shape of a brush for the drawing. For example, use of a circular brush makes it possible to obtain an outputted image like a pointillistic image, and use of a free trajectory brush pattern (Curved Brush Stroke) makes it possible to obtain an outputted image like an impressionistic image.

Meanwhile, brush-touch control techniques are proposed as in JP 2011-160306A and JP 2011-166217A (US 2011/0187732A1). In JP 2011-160306A, the brush size is changed depending on a distance between a subject of an image and a photographer. In JP 2011-166217A (US 2011/0187732A1), the brush size is changed depending on the area of a main subject.

SUMMARY

However, in the proposals described in JP H8-44867A (U.S. Pat. No. 5,621,868A) and Non-patent Document 1, it is necessary to repeat the drawing with the brush until a desirable outputted image is obtained. For example, it is necessary to update a value of a certain pixel many times until an output value thereof is determined.

For this reason, it takes a long process time to obtain a desirable outputted image in the proposals described in JP H8-44867A (U.S. Pat. No. 5,621,868A) and Non-patent Document 1.

The proposals described in JP 2011-160306A and JP 2011-166217A (US 2011/0187732A1) are techniques having a shorter process time than those in JP H8-44867A (U.S. Pat. No. 5,621,868A) and Non-patent Document 1, but are difficult to control a brush touch suitable for a painting.

The present inventors have recognized the circumstances as described above. According to embodiments of the present disclosure, it is possible to obtain an appropriate painterly flavor in an image in one process.

According to an embodiment of the present disclosure, there is provided an image processing apparatus including a vector detection unit which detects flow vectors of pixels in an inputted image, a vector-coherency calculation unit which calculates vector coherency based on the flow vectors detected by the vector detection unit, a deformation-characteristic computation unit which computes a deformation characteristic by using the vector coherency calculated by the vector-coherency calculation unit, the deformation characteristic being used for deforming a tap shape of a filter used for each of the pixels, and a painterly conversion unit which converts the inputted image based on the deformation characteristic computed by the deformation-characteristic computation unit.

The deformation-characteristic computation unit may include a brush-size selection computation unit which obtains a tap size of the filter by using the vector coherency calculated by the vector-coherency calculation unit, a stroke selection computation unit which obtains a tap length of the filter by using the flow vectors detected by the vector detection unit and the vector coherency calculated by the vector-coherency calculation unit, and a deformation-characteristic generation unit which generates the deformation characteristic based on the tap size obtained by the brush-size selection computation unit and the tap length obtained by the stroke selection computation unit.

The brush-size selection computation unit may have a plurality of lookup tables and obtains the tap size of the filter by using one of the lookup tables which is suitable for the inputted image. The stroke selection computation unit may have a plurality of lookup tables and obtains the tap length of the filter by using one of the lookup tables which is suitable for the inputted image.

The deformation-characteristic computation unit may include a brush-size selection computation unit which obtains a tap size of the filter by using the vector coherency calculated by the vector-coherency calculation unit, and a deformation-characteristic generation unit which generates the deformation characteristic based on the tap size obtained by the brush-size selection computation unit.

The brush-size selection computation unit may have a plurality of lookup tables and obtains the tap size of the filter by using one of the lookup tables which is suitable for the inputted image.

The deformation-characteristic computation unit may include a stroke selection computation unit which obtains a tap length of the filter by using the flow vectors detected by the vector detection unit and the vector coherency calculated by the vector-coherency calculation unit, and a deformation-characteristic generation unit which generates the deformation characteristic based on the tap length obtained by the stroke selection computation unit.

The stroke selection computation unit may have a plurality of lookup tables and obtains the tap length of the filter by using one of the lookup tables which is suitable for the inputted image.

The vector detection unit may detect directions of the flow vectors of the pixels in the inputted image. The vector-coherency calculation unit may calculate coherency in vector direction based on the flow vectors detected by the vector detection unit.

The vector detection unit may detect the directions and magnitudes of the flow vectors of the pixels in the inputted image. The vector-coherency calculation unit may calculate the coherency in vector direction and magnitude based on the directions and the magnitudes of the flow vectors detected by the vector detection unit.

According to an embodiment of the present disclosure, there is provided an image processing method, including detecting flow vectors of pixels in an inputted image, calculating vector coherency based on the detected flow vectors, computing a deformation characteristic by using the calculated vector coherency, the deformation characteristic being used for deforming a tap shape of a filter used for each of the pixels, and converting the inputted image based on the computed deformation characteristic.

According to an embodiment of the present disclosure, there is provided a program for causing a computer to function as a vector detection unit which detects flow vectors of pixels in an inputted image, a vector-coherency calculation unit which calculates vector coherency based on the flow vectors detected by the vector detection unit, a deformation-characteristic computation unit which computes a deformation characteristic by using the vector coherency calculated by the vector-coherency calculation unit, the deformation characteristic being used for deforming a tap shape of a filter used for each of the pixels, and a painterly conversion unit which converts the inputted image based on the deformation characteristic computed by the deformation characteristic computation unit.

In one aspect of the present disclosure, flow vectors of pixels in an inputted image are detected, vector coherency is calculated based on the detected flow vectors, and a deformation characteristic is computed by using at least the calculated vector coherency, the deformation characteristic being used for deforming a tap shape of a filter used on a pixel basis. Then, the inputted image is converted based on the computed deformation characteristics.

According to the embodiments of the present disclosure described above, an image can be converted into a painterly image. In particular, an appropriate painterly flavor can be obtained in the image in one process.

DETAILED DESCRIPTION OF THE EMBODIMENTS

Hereinafter, preferred embodiments of the present disclosure will be described in detail with reference to the appended drawings. Note that the description is given in the following order.

1. First Embodiment (image processing apparatus)
2. Second Embodiment (computer)
<1. First Embodiment (Image Processing Apparatus)>
[Configuration of Image Processing Apparatus]

Figure 1:
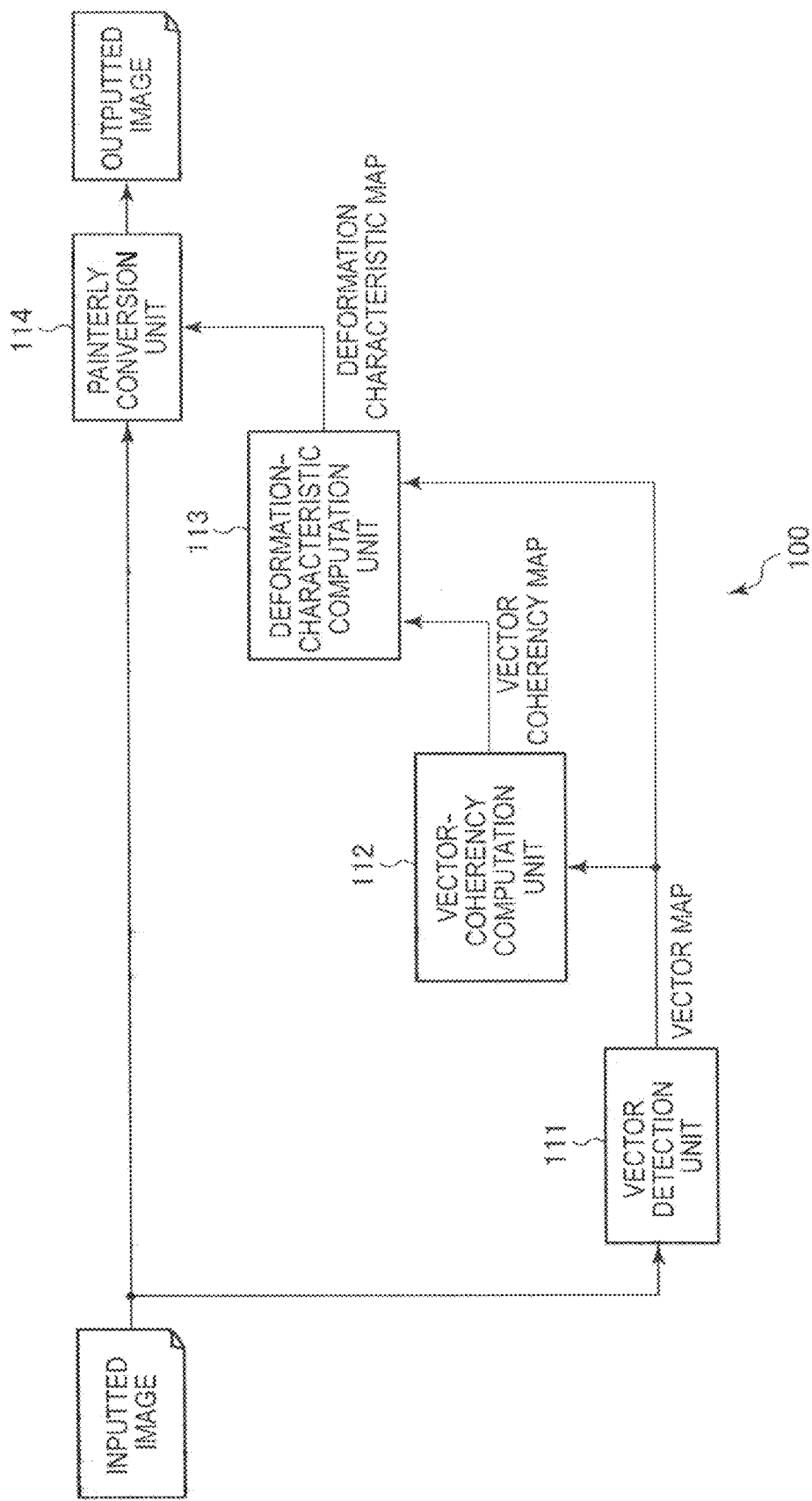
FIG. 1 is a block diagram illustrating a configuration example of an image processing apparatus to which an embodiment of the present technology is applied.

FIG. 1 is a diagram illustrating a configuration example of an image processing apparatus to which an embodiment of the present technology is applied.

In FIG. 1, an image processing apparatus 100 performs processing of converting an inputted image into a painterly image.

In the example in FIG. 1, the image processing apparatus 100 includes a vector detection unit 111, a vector-coherency computation unit 112, a deformation-characteristic computation unit 113, and a painterly conversion unit 114.

An inputted image (a real image) received from a previous processing unit is inputted to the vector detection unit 111 and the painterly conversion unit 114. Note that an image the size of which is reduced from the original inputted image may be inputted to the vector detection unit 111. An image reduced from the inputted image may also be inputted to the vector detection unit 111 and the painterly conversion unit 114. In the latter case, however, the image is enlarged when being outputted from the painterly conversion unit 114.

The vector detection unit 111 detects flow vectors from respective pixels of the inputted image and generates a vector Map which is a set of the flow vectors of the pixels. The vector detection unit 111 outputs the generated vector Map to the vector-coherency computation unit 112 and the deformation-characteristic computation unit 113.

The vector-coherency computation unit 112 analyzes coherency of the vector of each pixel based on the vector Map, that is, the set of the flow vectors of the pixels, which is received from the vector detection unit 111, and generates a vector coherency Map showing the coherency of each pixel. The vector-coherency computation unit 112 outputs the generated vector coherency Map to the deformation-characteristic computation unit 113.

By using the vector Map received from the vector detection unit 111 and the vector coherency Map received from the vector-coherency computation unit 112, the deformation-characteristic computation unit 113 computes a deformation characteristic for deforming a tap shape of a filter used on a pixel basis by the painterly conversion unit 114. The deformation-characteristic computation unit 113 generates a deformation characteristic Map which is a set of the computed deformation characteristics for the respective pixels, and outputs the generated deformation characteristic Map to the painterly conversion unit 114.

The painterly conversion unit 114 performs painterly conversion on the inputted image based on the deformation characteristic Map received from the deformation-characteristic computation unit 113, and outputs as an outputted image the image having undergone the painterly conversion to a unit for subsequent processing.

[Operation of Flow Vector Detection Unit]

Firstly, flow vector detection by the vector detection unit 111 will be described with reference to FIG. 2.

The vector detection unit 111 detects flow vector directions of all of the pixels of the inputted image. FIG. 2 shows an output example of a vector direction Map 133 in detecting a flow vector direction of each pixel in a detection area 132 in an inputted image 131. A part where a waterfall splashes on a rock in the inputted image 131 is the detection area 132, and flow vector directions therein are detected. Note that each vector direction detected at this time is between 0 degrees and 180 degrees inclusive.

Figure 2:
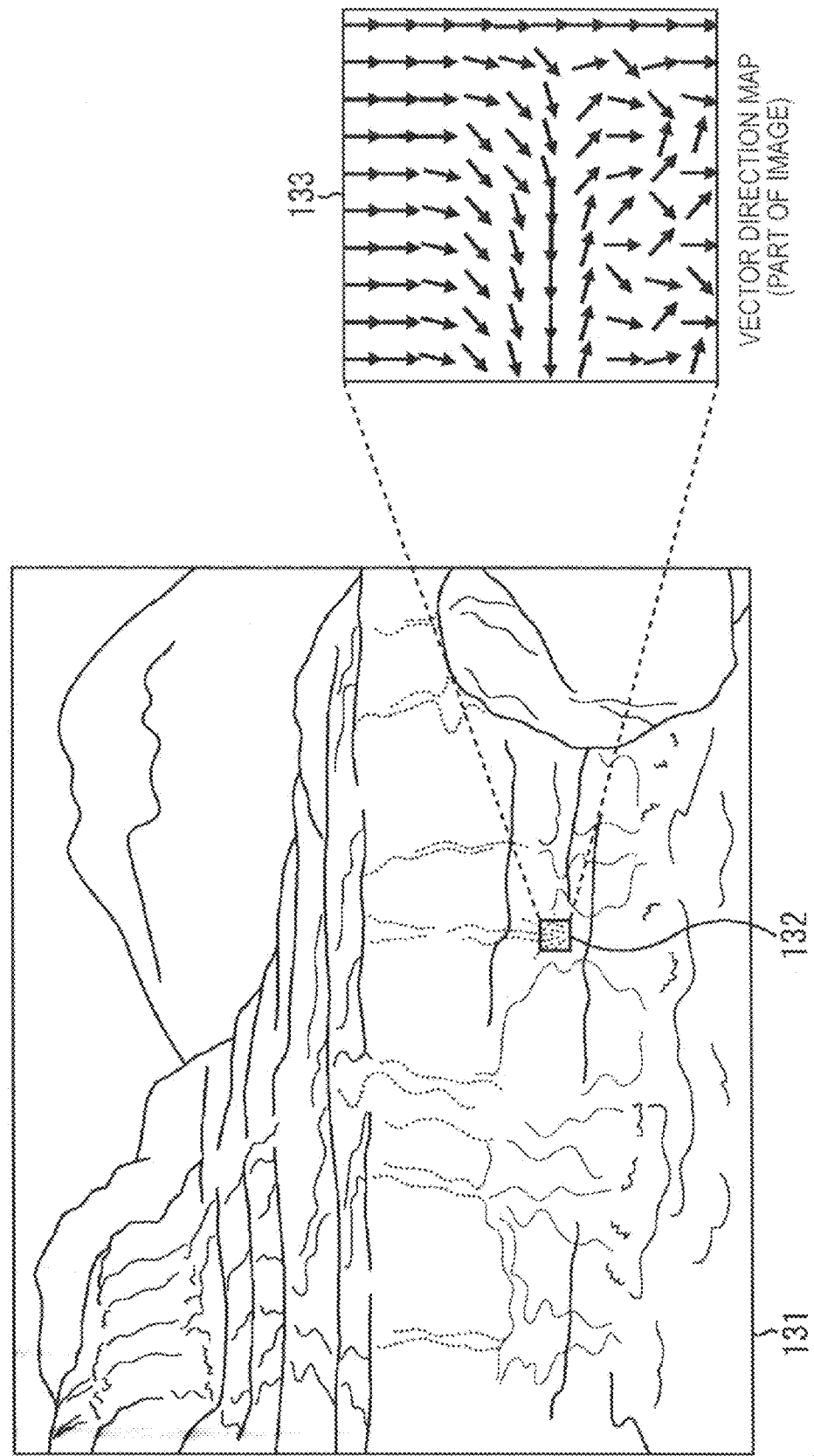
FIG. 2 is a diagram illustrating an example of a vector direction Map.

In addition, FIG. 2 shows an example of detecting the vector directions only. In contrast, when the vector-coherency computation unit 112 uses the vector directions and sizes (forces), the vector directions and sizes are detected and outputted to the vector-coherency computation unit 112.

[Operation of Vector-coherency Computation Unit]

Next, a vector-coherency computation process by the vector-coherency computation unit 112 will be described with reference to FIG. 3.

The vector-coherency computation unit 112 checks the vector directions of neighboring pixels of each pixel based on the vector direction Map 133 received from the vector detection unit 111, and determines the degree of the vector-direction coherency. When a large number of neighboring pixels have the same direction as that of the pixel in the center, it is determined that the pixel in the center has high coherency. In contrast, when a large number of neighboring pixels have discrete directions, it is determined that the pixel in the center has low coherency.

The vector-coherency computation unit 112 determines the degree of the coherency for each pixel based on the vector direction Map 133, and outputs the determination result as a vector-direction coherency Map 141 of the pixels to the deformation-characteristic computation unit 113.

Figure 3:
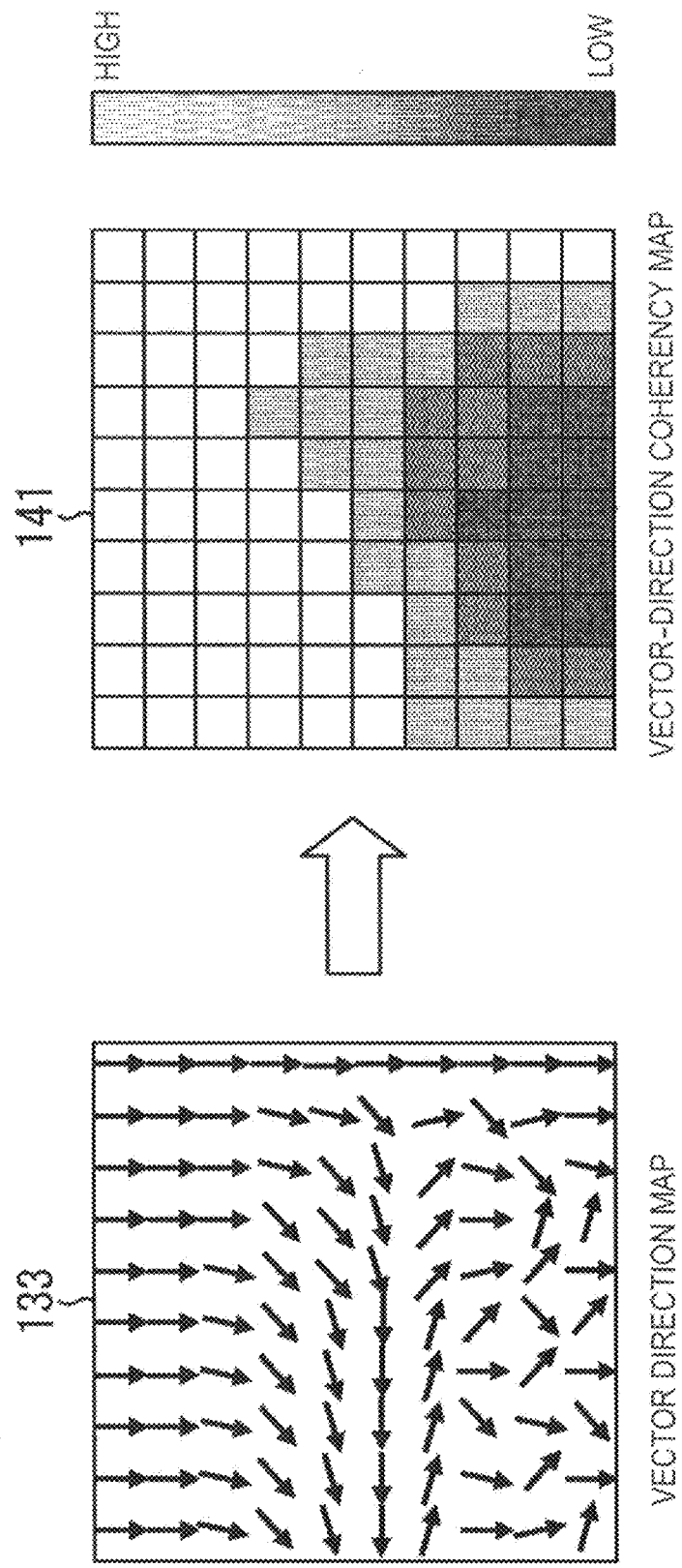
FIG. 3 is a diagram illustrating an example of a vector-direction coherency Map.

In the vector-direction coherency Map 141 in the example in FIG. 3, an upper part shows the same vector direction and thus high coherency, while a lower part shows various vector directions and thus low coherency.

Note that examples of a coherency calculation method used by the vector-coherency computation unit 112 include the structure tensor which is a technique of calculating coherency from gradient information of a neighborhood of each pixel. The technique of structure tensor is often used in image processing and computer vision.

Figure 4:
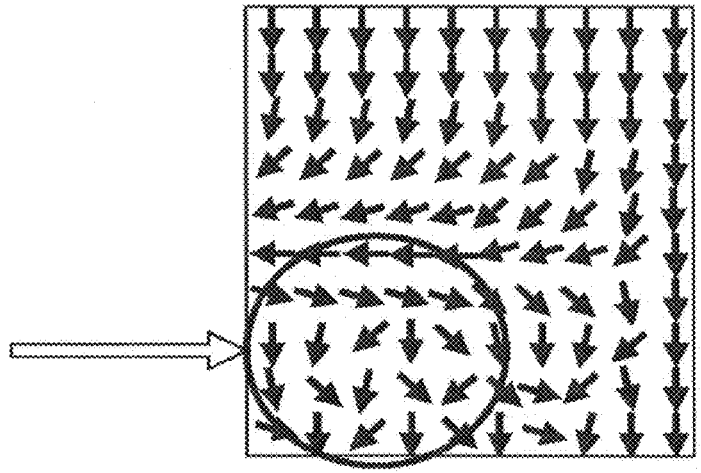
FIG. 4 is a diagram illustrating how to obtain vector-direction coherency.

In addition, examples of the coherency calculation method using another algorithm include a technique of calculating the coherency based on distribution of vectors of a neighborhood of each pixel. The coherency information can be calculated by obtaining the distribution of vectors in a certain neighborhood range as shown in FIG. 4.

Note that when the coherency is computed, vector information is used. The example of generating the coherency Map by using only the vector directions is taken in the description above, but the generation of the coherency Map is not limited to the example. In other words, it is also possible to generate the coherency Map in consideration of the vector directions and sizes (forces).

[Configuration of Deformation-characteristic Computation Unit]

Figure 5:
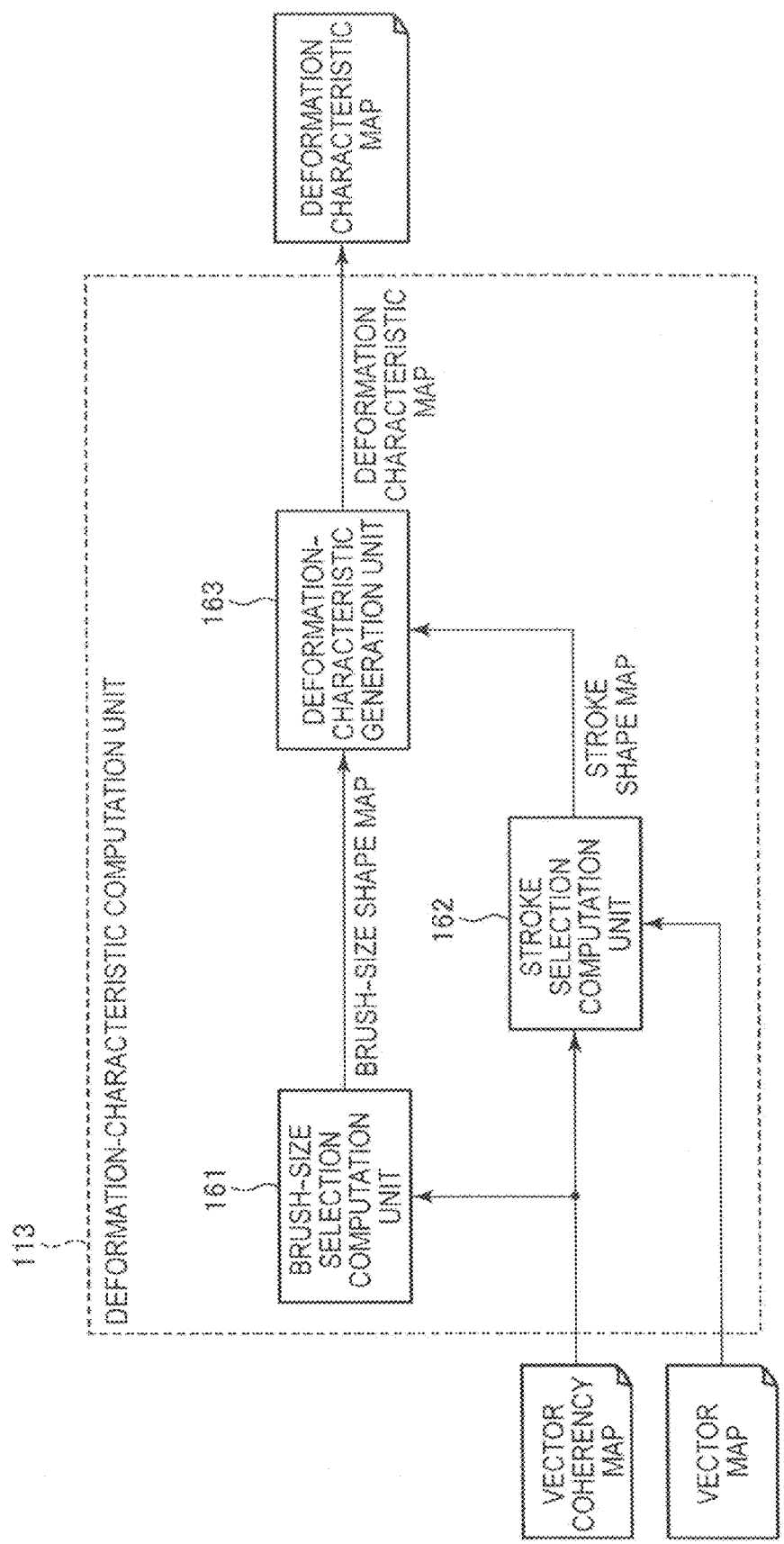
FIG. 5 is a block diagram illustrating a configuration example of a deformation-characteristic computation unit.

FIG. 5 is a block diagram illustrating a configuration example of the deformation-characteristic computation unit 113.

In the example in FIG. 5, the deformation-characteristic computation unit 113 includes a brush-size selection computation unit 161, a stroke selection computation unit 162, and a deformation-characteristic generation unit 163.

The vector Map from the vector detection unit 111 is inputted to the stroke selection computation unit 162. The vector coherency Map from the vector-coherency computation unit 112 is inputted to the brush-size selection computation unit 161 and the stroke selection computation unit 162.

The brush-size selection computation unit 161 determines which brush size is used for converting a target one of the pixels by using the vector coherency Map received from the vector-coherency computation unit 112. In other words, the brush-size selection computation unit 161 determines a tap size of a filter used on the pixel basis by the painterly conversion unit 114. Note that the tap size takes on a value corresponding to the size of the filter.

The brush-size selection computation unit 161 generates a brush-size shape Map in such a manner as to select a brush size pixel by pixel by using a brush-size control LUT (a lookup table), the brush size corresponding to a target-pixel value in the vector coherency Map. The brush-size selection computation unit 161 outputs the generated brush-size shape Map to the deformation-characteristic generation unit 163.

The stroke selection computation unit 162 determines which brush-touch stroke is used for converting the target pixel by using the vector Map received from the vector detection unit 111 and the vector coherency Map received from the vector-coherency computation unit 112. In other words, the stroke selection computation unit 162 determines the tap length and direction of the filter used by the painterly conversion unit 114.

The stroke selection computation unit 162 generates a stroke shape Map in such a manner as to select a brush-touch stroke (length) pixel by pixel by using a brush-stroke control LUT (a lookup table) and as to refer to the corresponding direction in the vector Map, the brush-touch stroke corresponding to a target-pixel value in the vector coherency Map. The stroke selection computation unit 162 outputs the generated stroke shape Map to the deformation-characteristic generation unit 163.

The deformation-characteristic generation unit 163 generates a deformation characteristic for deforming the tap shape of the filter used on the pixel basis by the painterly conversion unit 114, based on the brush-size shape Map received from the brush-size selection computation unit 161 and the stroke shape Map received from the stroke selection computation unit 162. The deformation-characteristic generation unit 163 outputs the deformation characteristic Map which is information of a set of the deformation characteristics generated for the respective pixels, to the painterly conversion unit 114.

[Control Lookup Table Examples]

The brush-size selection computation unit 161 and the stroke selection computation unit 162 can control the stroke length and the brush size based on the coherency and each have a plurality of control LUTs. Accordingly, it is possible to change the control LUT depending on the type of the inputted image.

Figure 6:
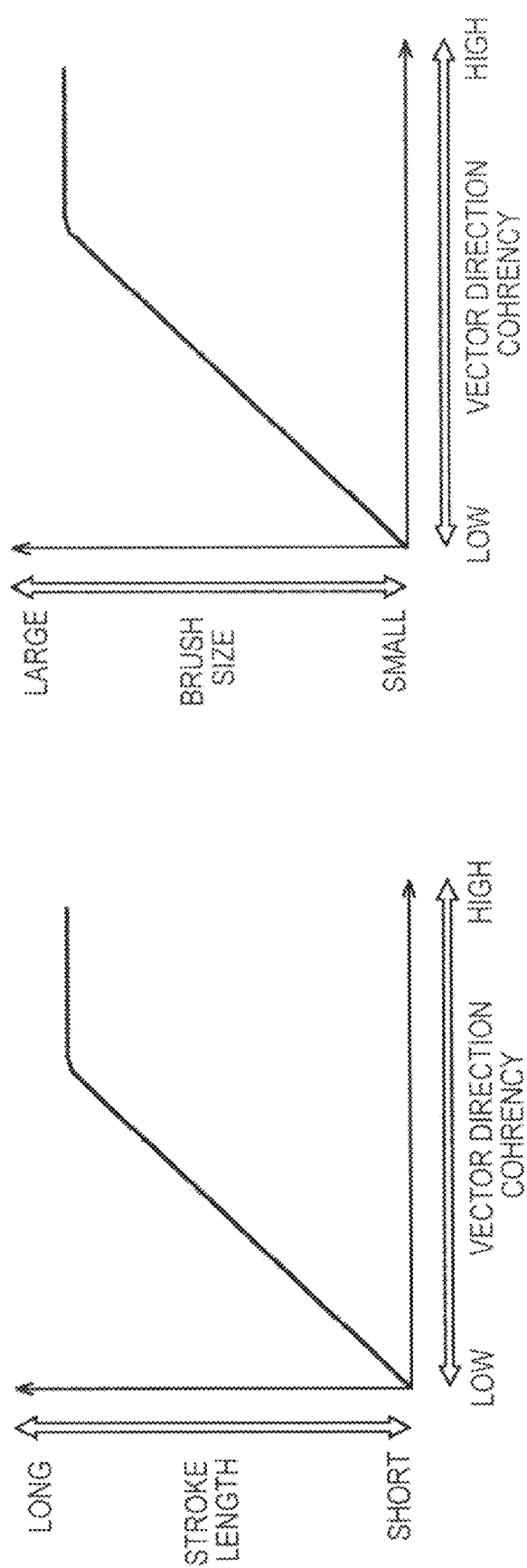
FIG. 6 illustrates examples of a brush-stroke control LUT and a brush-size control LUT.

FIG. 6 shows examples of a brush-stroke control LUT and a brush-size control LUT which are suitable for an image having a small number of high frequency components.

In the brush-stroke control LUT, the vertical axis represents the length of a stroke, and the horizontal axis represents the degree of the vector-direction coherency.

In the brush-stroke control LUT, the lower the vector-direction coherency, the shorter the stroke is.

In the brush-size control LUT, the vertical axis represents the size of the brush, and the horizontal axis represents the degree of the vector-direction coherency. In the brush-size control LUT, the lower the vector-direction coherency is, the smaller the brush size is.

Figure 7:
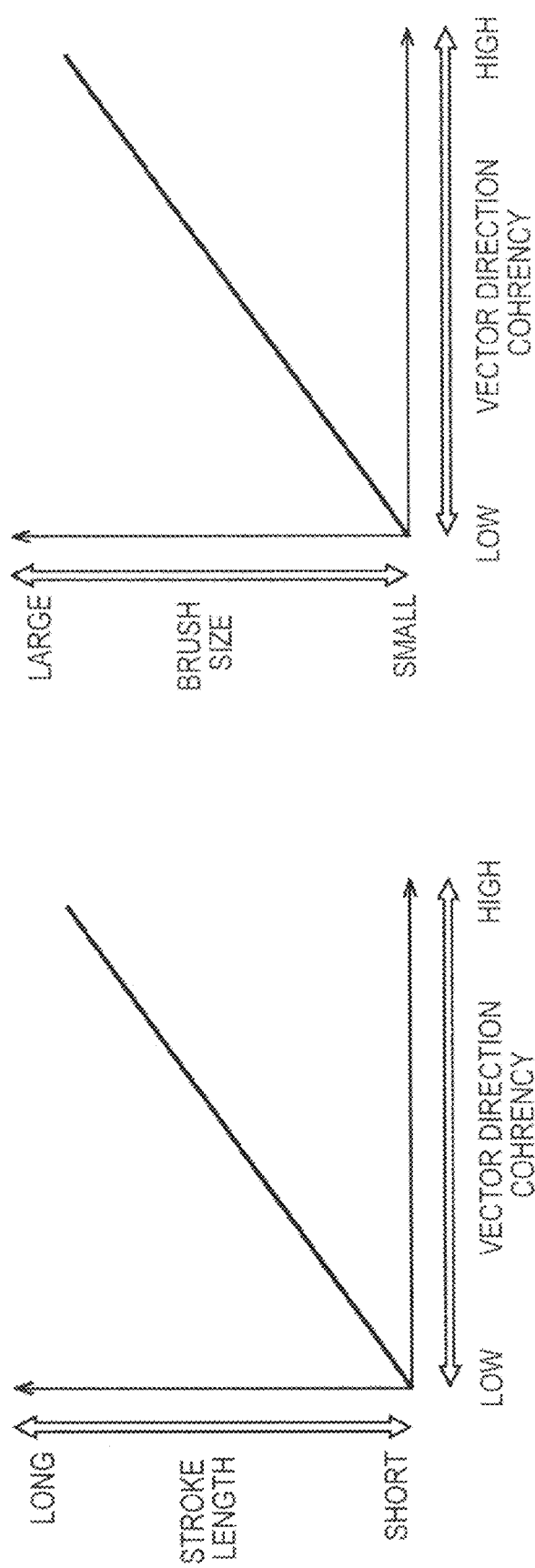
FIG. 7 illustrates examples of a brush-stroke control LUT and a brush-size control LUT.

Since the image having a small number of high frequency components has a comparatively large number of flat portions, the brush-stroke control LUT and the brush-size control LUT in FIG. 6 are set so that the stroke length and the brush size can be increased as much as possible from those in the examples in FIG. 7. The brush-stroke control LUT and the brush-size control LUT in FIG. 6 can make the brush touch showy.

FIG. 7 shows examples of a brush-stroke control LUT and a brush-size control LUT which are suitable for a standard image having neither a large number nor a small number of high frequency components. The brush-stroke control LUT and the brush-size control LUT in FIG. 7 exhibit linear setting.

Figure 8:
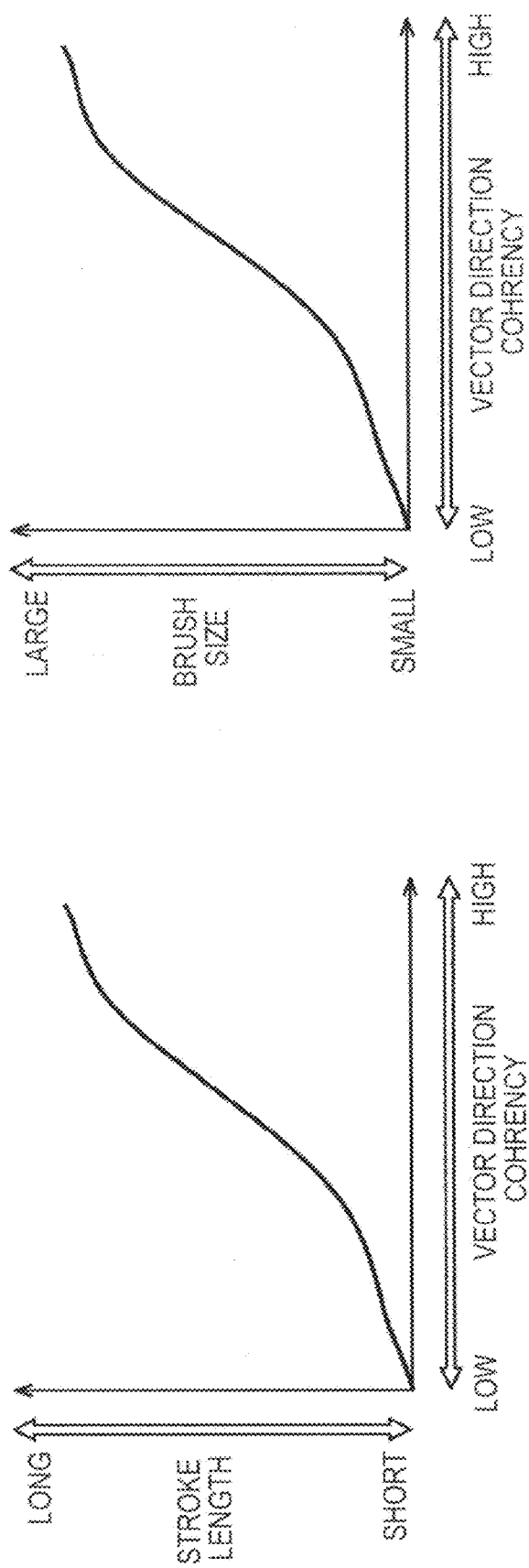
FIG. 8 illustrates examples of a brush-stroke control LUT and a brush-size control LUT.

FIG. 8 shows examples of a brush-stroke control LUT and a brush-size control LUT which are suitable for an image having a large number of high frequency components.

For the image having the large number of high frequency components, the brush-stroke control LUT and the brush-size control LUT in FIG. 8 are set so that the stroke length and the brush size can be decreased as much as possible from those in FIG. 7 to prevent fine regions of the image from being painted out. The brush-stroke control LUT and the brush-size control LUT in FIG. 8 can express the fine regions in the image without being painted out.

As described above, since the plurality of control LUTs are provided for controlling each of the stroke length and the brush size, it is possible to use a suitable LUT depending on the type of the inputted image.

[Brush Size Examples]

Figure 9:
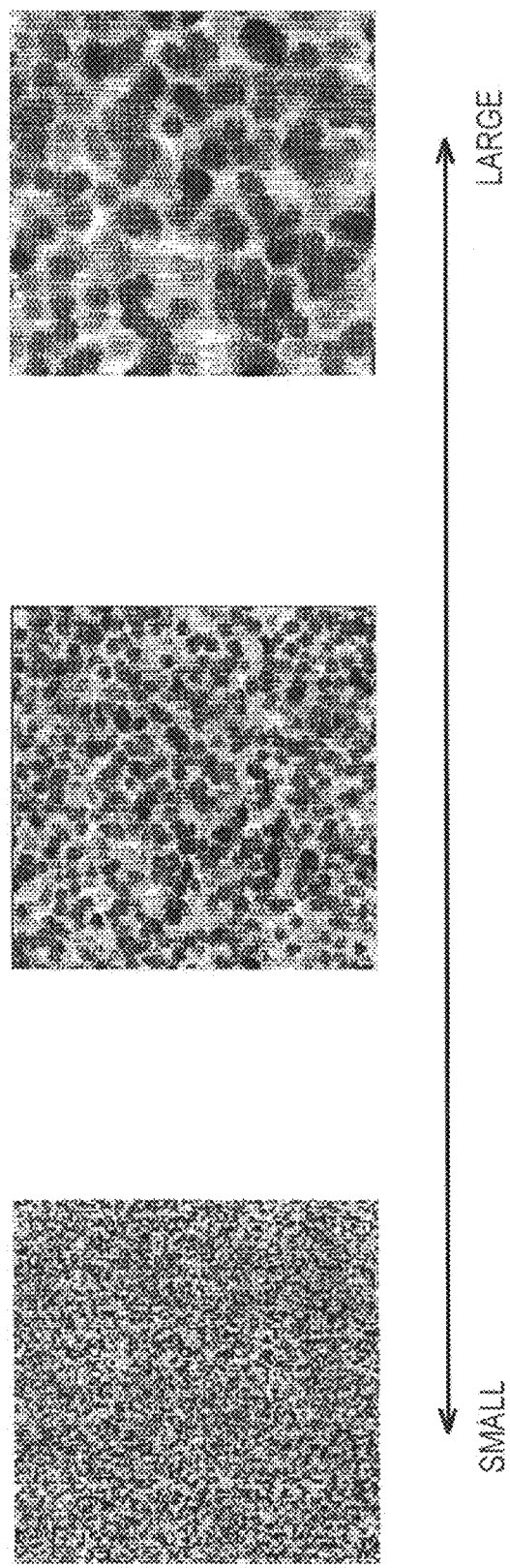
FIG. 9 illustrates brush sizes.

FIG. 9 illustrates images each represented in a brush size selected depending on the degree of the vector coherency.

In the case of low vector coherency, a narrow (small) brush size as shown in a left part of FIG. 9 is selected. In the case of high vector coherency, a wide (large) brush size as shown in a right part of FIG. 9 is selected.

[Stroke Length Examples]

Figure 10:
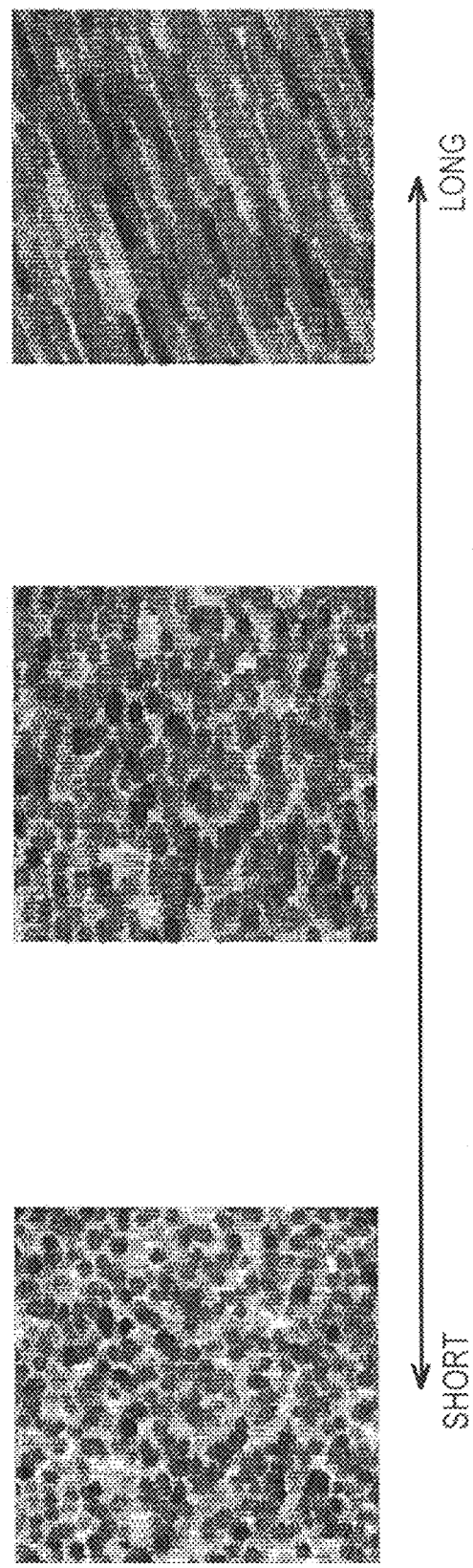
FIG. 10 illustrates lengths of brush-touch strokes.

FIG. 10 illustrates images each represented in a brush-touch stroke selected depending on the degree of the vector coherency.

In the case of low vector coherency, a short stroke as shown in a left part of FIG. 10 is selected. In the case of high vector coherency, a long stroke as shown in a right part of FIG. 10 is selected.

[Operation of Image Processing Apparatus]

Figure 11:
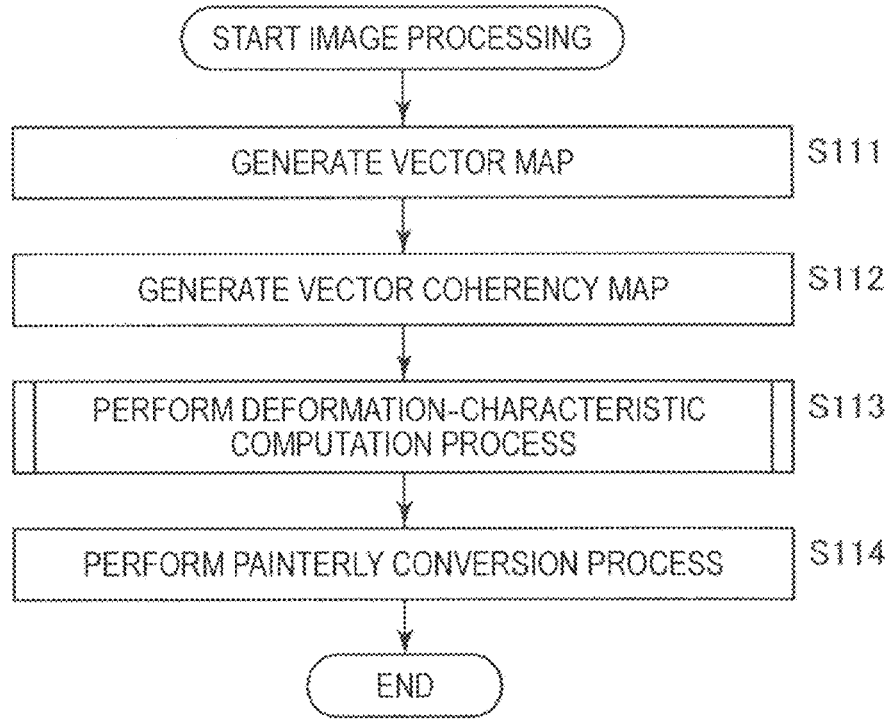
FIG. 11 is a flowchart illustrating image processing.

Next, image processing by the image processing apparatus 100 will be described with reference to a flowchart of FIG. 11.

An inputted image passed over from the previous processing unit is inputted to the vector detection unit 111 and the painterly conversion unit 114. In Step S111, the vector detection unit 111 detects flow vectors of pixels from the inputted image and generates a vector Map of the pixels. The generated vector Map is outputted to the vector-coherency computation unit 112 and the deformation-characteristic computation unit 113.

In Step S112, the vector-coherency computation unit 112 analyzes the coherency of the vector of each pixel based on the vector Map received from the vector detection unit 111, and generates a vector coherency Map of the pixels. The generated vector coherency Map is outputted to the deformation-characteristic computation unit 113.

In Step S113, the deformation-characteristic computation unit 113 performs a process of computing a deformation characteristic for deforming the tap shape of the filter used by the painterly conversion unit 114. The deformation-characteristic computation process will be described later with reference to FIG. 12.

In accordance with the process in Step S113, a deformation characteristic Map is generated, and the generated deformation characteristic Map is outputted to the painterly conversion unit 114.

In Step S114, the painterly conversion unit 114 performs painterly conversion on the inputted image based on the deformation characteristic Map received from the deformation-characteristic computation unit 113. The image after the painterly conversion is outputted as an outputted image to a subsequent processing unit.

[Deformation-characteristic Computation Process Examples]

Figure 12:
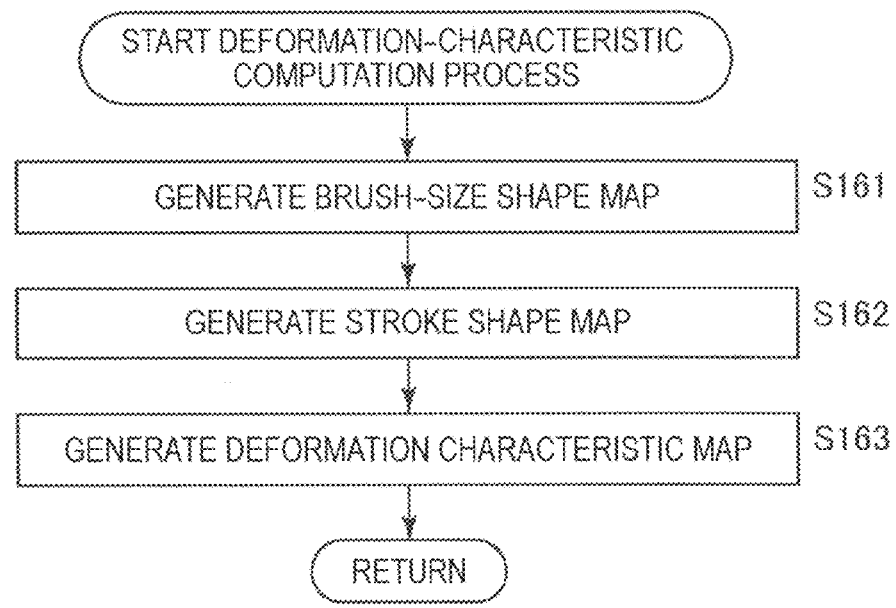
FIG. 12 is a flowchart illustrating a deformation-characteristic computation process.

Next, a deformation-characteristic computation process in Step S113 in FIG. 11 will be described with reference to a flowchart of FIG. 12.

In Step S161, the brush-size selection computation unit 161 generates a brush-size shape Map. In other words, the brush-size selection computation unit 161 generates the brush-size shape Map in such a manner as to select a brush size pixel by pixel by using one of the brush-size control LUTs, the brush size corresponding to a target-pixel value in the vector coherency Map generated in Step S112 in FIG. 11. The generated brush-size shape Map is outputted to the deformation-characteristic generation unit 163.

In Step S162, the stroke selection computation unit 162 generates a stroke shape Map. In other words, the stroke selection computation unit 162 selects a brush-touch stroke pixel by pixel by using one of the brush-stroke control LUTs, the brush-touch stroke corresponding to a target-pixel value in the vector coherency Map generated in Step S112 in FIG. 11. Then, the stroke selection computation unit 162 refers to the corresponding direction in the vector Map generated in Step S111 in FIG. 11, and thereby generates the stroke shape Map. The generated stroke shape Map is outputted to the deformation-characteristic generation unit 163.

In Step S163, the deformation-characteristic generation unit 163 generates the deformation characteristic used for deforming the tap shape of the filter used by the painterly conversion unit 114. In other words, the deformation-characteristic generation unit 163 generates the deformation characteristic based on the brush-size shape Map generated in Step S161 and the stroke shape Map generated in Step S162 and received from the stroke selection computation unit 162. The deformation characteristic Map which is information of each generated deformation characteristic is outputted to the painterly conversion unit 114.

As described above, since the brush touch (the tap shape of the filter) is controlled by using the vector coherency information, it is possible to obtain an appropriate painterly flavor in an image in one process. In other words, it is possible to obtain an image having the appropriate painterly flavor by controlling the brush-touch not entirely but partially in the image.

For example, for a tree having leaves which are considerably long and extend in uniform directions has high coherency, a tap shape having a large brush size and a long stroke is selected. Thereby, it is possible to reproduce a pleasing brush touch without chopping the leaves.

For example, for a tree having leaves extending in non-uniform directions has low coherency, a tap shape having a comparatively small brush size and a short stroke is selected. Thereby, it is possible to reproduce even minute parts of the leaves by using the fine brush touch.

That is, the conversion of an image leads to lengths and sizes which are not monotonous in the brush touch and thus can enhance the degree of perfection of the paint.

In addition, since flows (coherency) of the paintbrush are used as detections, it is possible to express the brush touch more collectively.

As described above, according to the embodiment of the present technology, an appropriate brush touch expression is locally selected in one process, and thus painting expression in a brush touch as if it were a touch by a painter can be achieved.

In addition, since the coherency detected in an inputted image, it is possible to realize brush touch control appropriate for the image.

Further, since the filter for the brush touch is changed based on the coherency, it is possible to apply a small filter range to a portion where the painterly expression is not necessary. Accordingly, the processes can be performed also at high speed as a whole.

[Another Configuration of Deformation-characteristic Computation Unit]

Figure 13:
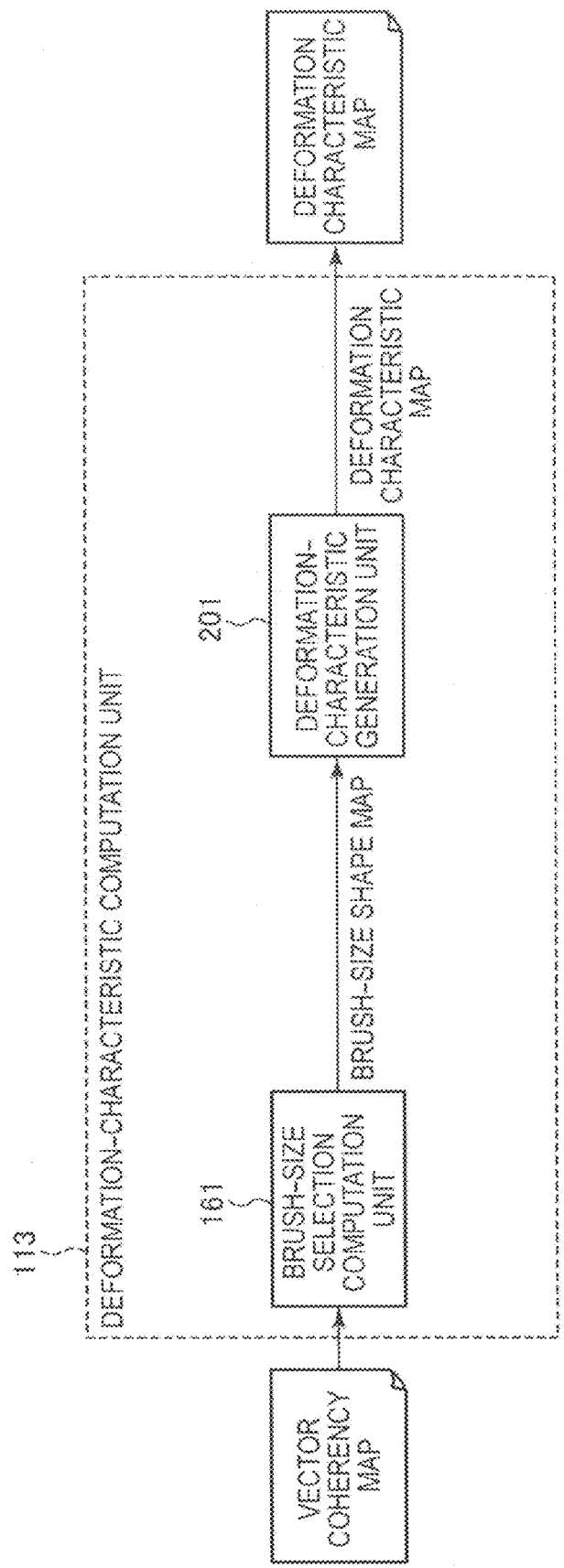
FIG. 13 is a block diagram illustrating another configuration example of the image processing apparatus to which an embodiment of the present technology is applied.

FIG. 13 is a block diagram illustrating another configuration example of the deformation-characteristic computation unit 113.

In the example in FIG. 13, a deformation-characteristic computation unit 113 includes the brush-size selection computation unit 161 and a deformation-characteristic generation unit 201. Note that in the example in FIG. 13, the vector coherency Map generated by the vector-coherency computation unit 112 is inputted to the brush-size selection computation unit 161, but the vector Map generated by the vector detection unit 111 is not inputted to the deformation-characteristic computation unit 113.

The deformation-characteristic computation unit 113 in FIG. 13 is similar to the deformation-characteristic computation unit 113 in FIG. 5 in that the brush-size selection computation unit 161 is included therein. The deformation-characteristic computation unit 113 in FIG. 13 is different from the deformation-characteristic computation unit 113 in FIG. 5 in that the stroke selection computation unit 162 is eliminated and that the deformation-characteristic generation unit 163 is replaced with the deformation-characteristic generation unit 201.

The deformation-characteristic generation unit 201 generates a deformation characteristic for deforming the tap shape (size) of the filter used by the painterly conversion unit 114, based on the brush-size shape Map from the brush-size selection computation unit 161. In other words, the deformation-characteristic generation unit 201 generates the deformation characteristic for converting an image into a painterly image like a pointillistic image. The deformation-characteristic generation unit 201 outputs a deformation characteristic Map which is information of each generated deformation characteristic to the painterly conversion unit 114.

[Deformation-characteristic Computation Process Example]

Figure 14:
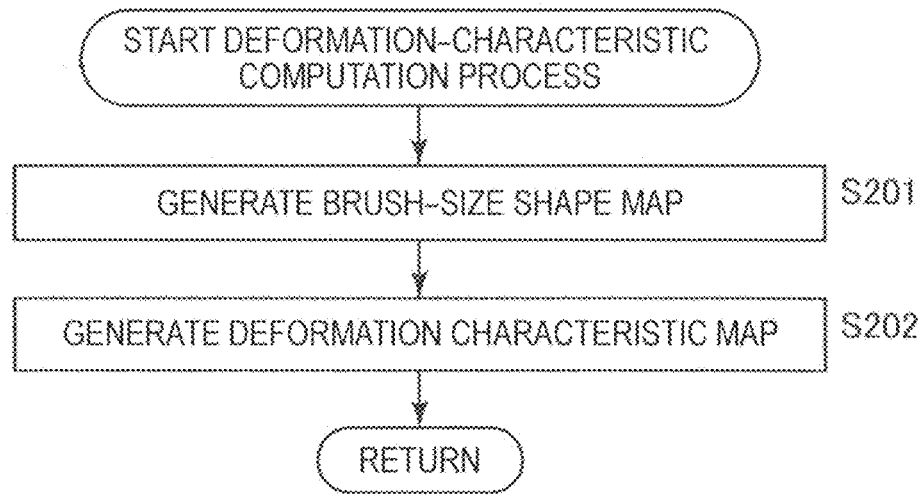
FIG. 14 is a flowchart illustrating a deformation-characteristic computation process.

Next, a deformation-characteristic computation process performed by the deformation-characteristic computation unit 113 in FIG. 13 will be described with reference to a flowchart of FIG. 14. The deformation-characteristic computation process is another example of the deformation-characteristic computation process in Step S113 in FIG. 11 described above with reference to FIG. 12.

In Step S201, the brush-size selection computation unit 161 generates a brush-size shape Map. In other words, the brush-size selection computation unit 161 generates the brush-size shape Map in such a manner as to select a brush size pixel by pixel by using one of the brush-size control LUTs, the brush size corresponding to a target-pixel value in the vector coherency Map generated in Step S112 in FIG. 11. The generated brush-size shape Map is outputted to the deformation-characteristic generation unit 201.

In Step S202, the deformation-characteristic generation unit 201 generates a deformation characteristic for deforming the tap shape of the filter used by the painterly conversion unit 114. In other words, the deformation-characteristic generation unit 201 generates the deformation characteristic based on the brush-size shape Map generated in Step S201, the deformation characteristic being for converting an image into a painterly image like a pointillistic image. A deformation characteristic Map which is information of each generated deformation characteristic is outputted to the painterly conversion unit 114.

As described above, since the pointillistic size (the tap shape of the filter) is controlled by using the vector coherency information, it is possible to obtain an appropriate painterly flavor in one process also in an image like a pointillistic image.

[Still Another Example of Deformation-characteristic Computation Unit]

Figure 15:
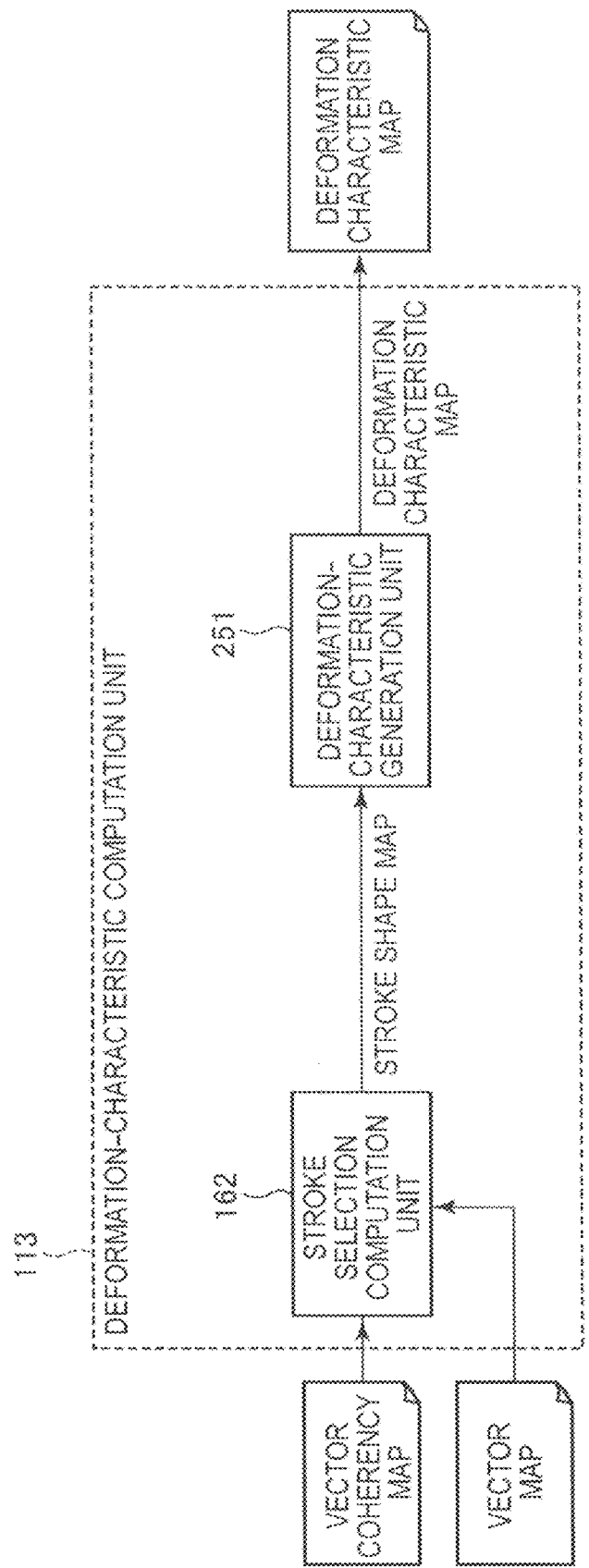
FIG. 15 is a block diagram illustrating still another configuration example of the image processing apparatus to which an embodiment of the present technology is applied.

FIG. 15 a block diagram illustrating still another configuration example of the deformation-characteristic computation unit 113.

In the example in FIG. 15, a deformation-characteristic computation unit 113 includes the stroke selection computation unit 162 and a deformation-characteristic generation unit 251.

The deformation-characteristic computation unit 113 in FIG. 15 is similar to the deformation-characteristic computation unit 113 in FIG. 5 in that the stroke selection computation unit 162 is included therein. The deformation-characteristic computation unit 113 in FIG. 15 is different from the deformation-characteristic computation unit 113 in FIG. 5 in that brush-size selection computation unit 161 is eliminated and that the deformation-characteristic generation unit 163 is replaced with the deformation-characteristic generation unit 251.

The deformation-characteristic generation unit 251 generates a deformation characteristic based on the stroke shape Map received from the stroke selection computation unit 162, the deformation characteristic being for deforming the tap shape (the length and the direction) of the filter used by the painterly conversion unit 114. In other words, the deformation-characteristic generation unit 251 generates the deformation characteristic for converting an image into a painterly image having thin strokes. The deformation-characteristic generation unit 251 outputs the deformation characteristic Map which is information of each generated deformation characteristic to the painterly conversion unit 114.

[Deformation-characteristic Computation Process Example]

Figure 16:
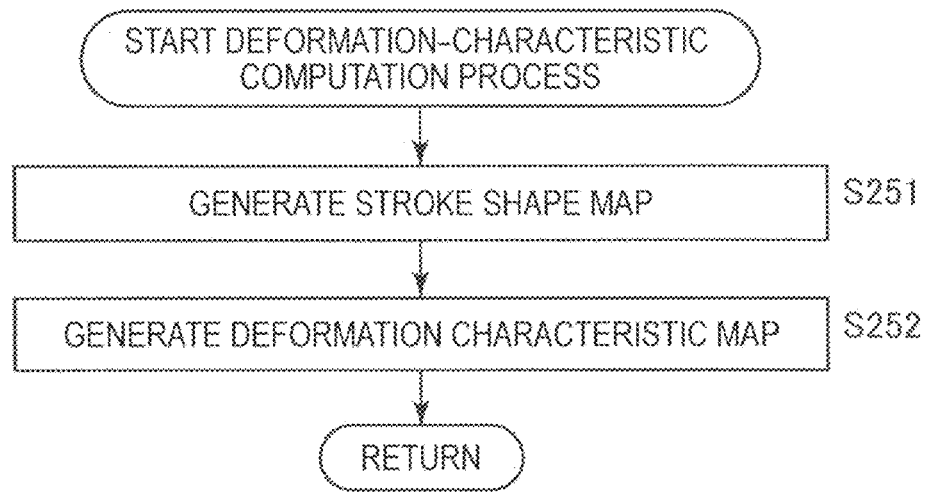
FIG. 16 is a flowchart illustrating a deformation-characteristic computation process.

Next, a deformation-characteristic computation process performed by the deformation-characteristic computation unit 113 in FIG. 15 will be described with reference to a flowchart of FIG. 16. The deformation-characteristic computation process is still another example of the deformation-characteristic computation process in Step S113 in FIG. 11 described above with reference to FIG. 12.

In Step S251, the stroke selection computation unit 162 generates a stroke shape Map. In other words, the stroke selection computation unit 162 selects a brush-touch stroke pixel by pixel by using one of the brush-stroke control LUTs, the brush-touch stroke corresponding to a target-pixel value in the vector coherency Map generated in Step S112 in FIG. 11. Then, the stroke selection computation unit 162 refers to the corresponding direction in the vector Map generated in Step S111 in FIG. 11, and thereby generates the stroke shape Map. The generated stroke shape Map is outputted to the deformation-characteristic generation unit 251.

In Step S252, the deformation-characteristic generation unit 251 generates a deformation characteristic for deforming the tap shape of the filter used by the painterly conversion unit 114. In other words, the deformation-characteristic generation unit 251 generates the deformation characteristic based on the stroke shape Map generated in Step S251 by the stroke selection computation unit 162, the deformation characteristic being for converting an image into a painterly image having thin strokes. A deformation characteristic Map which is information of each generated deformation characteristic is outputted to the painterly conversion unit 114.

As described above, since the length of each thin stroke (the tap shape of the filter) is controlled by using the vector coherency information, it is possible to obtain an appropriate painterly flavor in one process also in an image having thin strokes.

Note that the description has been given of the image processing apparatus taken as an example, but the embodiment of the present technology is not limited to the image processing apparatus. In other words, the present technology is applicable to not only the image processing apparatus but also a camera, a mobile phone, a personal computer or the like each of which has an image capturing function.

Incidentally, the above mentioned series of processes can be executed by hardware, or can be executed by software. In the case where the series of processes is executed by software, a program configuring this software is installed in a computer. Here, a computer incorporated into specialized hardware, and a general-purpose personal computer, which is capable of executing various functions by installing various programs, are included in the computer.

<2. Second Embodiment (Computer)>

[Configuration Example of Computer]

Figure 17:
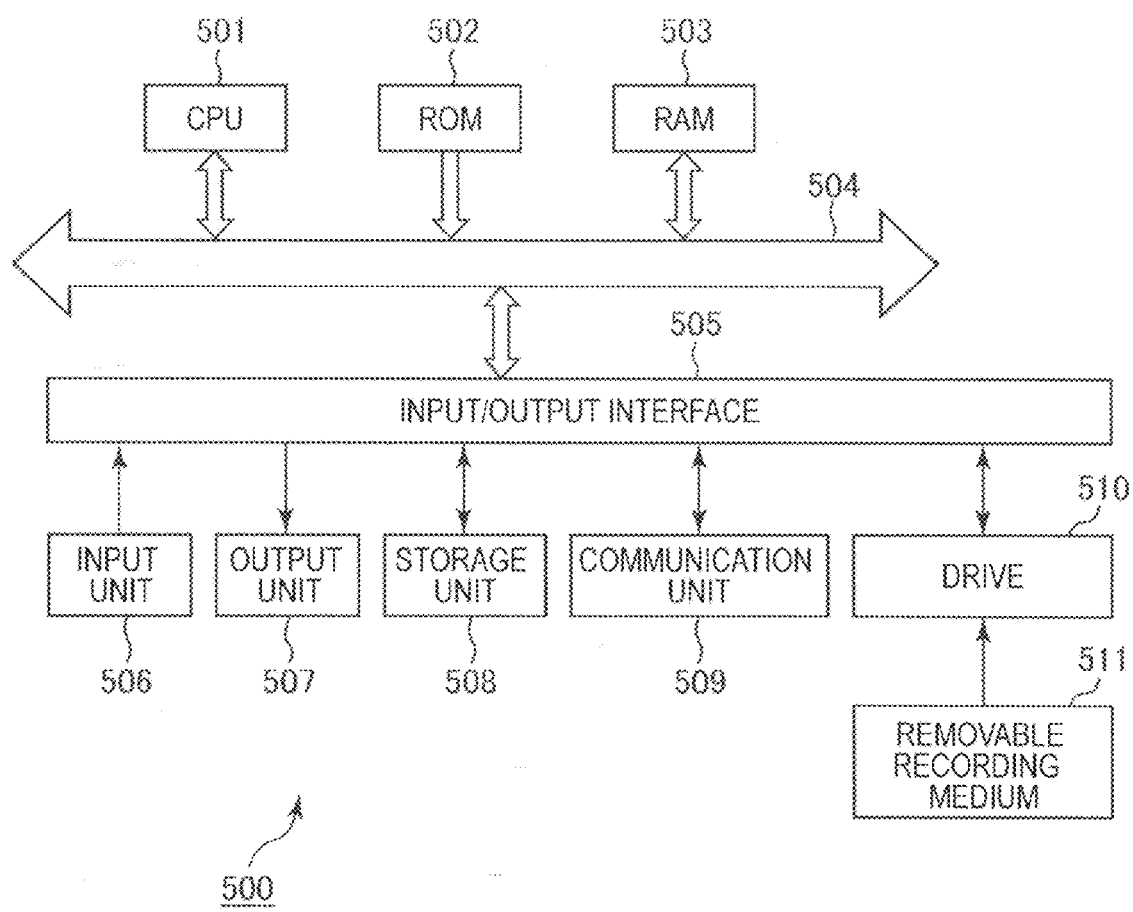
FIG. 17 is a block diagram illustrating a configuration example of a computer.

FIG. 17 illustrates a configuration example of hardware of a computer that executes the above series of processes by programs.

In the computer 500, a CPU (Central Processing Unit) 501, a ROM (Read Only Memory) 502 and a RAM (Random Access Memory) 503 are connected to each other via a bus 504.

The bus 504 is further connected to an input/output interface 505. The input/output interface 505 is connected to an input unit 506, an output unit 507, a storage unit 508, a communication unit 509 and a drive 510.

The input unit 506 includes a keyboard, a mouse and a microphone, and so on. The output unit 507 includes a display and a speaker, and so on. The storage unit 508 includes a hard disk and a nonvolatile memory, and so on. The communication unit 509 includes a network interface and so on. The drive 510 drives removable recording medium 511 such as a magnetic disk, an optical disk, a magnetic-optical disk and a semiconductor memory.

In the computer configured as above, for example, the CPU 501 loads the programs stored in the storage unit 508 onto the RAM 503 via the input/output interface 505 and the bus 504 and executes the programs, thereby performing the above series of processes.

The programs executed by the computer (i.e. CPU 501) can be recorded in the removable recording medium 511 such as a package medium and provided. Also, the programs can be provided via a wired or wireless transmission medium such as a local area network, the Internet and digital satellite broadcasting.

In the computer, by attaching the removable recording medium 511 to the drive 510, it is possible to install the programs in the storage unit 508 via the input/output interface 505. Also, it is possible to receive the programs in the communication unit 509 via the wired or wireless transmission medium and install them in the storage unit 508. In addition, it is possible to install the programs in advance in the ROM 502 or the storage unit 508.

Programs executed by a computer may be performed in time-series according to the description order of the present disclosure, or may be performed in parallel or at necessary timings when called.

In the present disclosure, steps of describing the above series of processes may include processing performed in time-series according to the description order and processing not processed in time-series but performed in parallel or individually.

Embodiments of the present disclosure are not limited to the above-described embodiments and can be variously modified within the gist of the present disclosure.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Also, the configuration described above as one device (or processing unit) may be divided into a plurality of devices (or processing units). On the other hand, the configuration described above as a plurality of devices (or processing units) may be integrated into one device. Also, other components may be added to the configuration of each device (or each processing unit). As long as the configuration or operation of the system is substantially similar as a whole, a part of the configuration of any device (or processing unit) may also be allowed to be included in other devices (or other processing units). The present technology is not limited to the above-mentioned embodiments, but can be variously modified within the scope of the present disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
   a vector detection unit which detects flow vectors of pixels in an inputted image;

a vector-coherency calculation unit which calculates vector coherency based on the flow vectors detected by the vector detection unit;
a deformation-characteristic computation unit which computes a deformation characteristic by using the vector coherency calculated by the vector-coherency calculation unit, the deformation characteristic being used for deforming a tap shape of a filter used for each of the pixels; and
a painterly conversion unit which converts the inputted image based on the deformation characteristic computed by the deformation-characteristic computation unit.

(2) The image processing apparatus according to (1),
wherein the deformation-characteristic computation unit includes
a brush-size selection computation unit which obtains a tap size of the filter by using the vector coherency calculated by the vector-coherency calculation unit,
a stroke selection computation unit which obtains a tap length of the filter by using the flow vectors detected by the vector detection unit and the vector coherency calculated by the vector-coherency calculation unit, and
a deformation-characteristic generation unit which generates the deformation characteristic based on the tap size obtained by the brush-size selection computation unit and the tap length obtained by the stroke selection computation unit.

(3) The image processing apparatus according to (2),
wherein the brush-size selection computation unit has a plurality of lookup tables and obtains the tap size of the filter by using one of the lookup tables which is suitable for the inputted image, and
wherein the stroke selection computation unit has a plurality of lookup tables and obtains the tap length of the filter by using one of the lookup tables which is suitable for the inputted image.

(4) The image processing apparatus according to (1),
wherein the deformation-characteristic computation unit includes
a brush-size selection computation unit which obtains a tap size of the filter by using the vector coherency calculated by the vector-coherency calculation unit, and
a deformation-characteristic generation unit which generates the deformation characteristic based on the tap size obtained by the brush-size selection computation unit.

(5) The image processing apparatus according to (4),
wherein the brush-size selection computation unit has a plurality of lookup tables and obtains the tap size of the filter by using one of the lookup tables which is suitable for the inputted image.

(6) The image processing apparatus according to (1),
wherein the deformation-characteristic computation unit includes
a stroke selection computation unit which obtains a tap length of the filter by using the flow vectors detected by the vector detection unit and the vector coherency calculated by the vector-coherency calculation unit, and
a deformation-characteristic generation unit which generates the deformation characteristic based on the tap length obtained by the stroke selection computation unit.

(7) The image processing apparatus according to (6),
wherein the stroke selection computation unit has a plurality of lookup tables and obtains the tap length of the filter by using one of the lookup tables which is suitable for the inputted image.

(8) The image processing apparatus according to (1),
wherein the vector detection unit detects directions of the flow vectors of the pixels in the inputted image, and
wherein the vector-coherency calculation unit calculates coherency in vector direction based on the flow vectors detected by the vector detection unit.

(9) The image processing apparatus according to (8),
wherein the vector detection unit detects the directions and magnitudes of the flow vectors of the pixels in the inputted image, and
wherein the vector-coherency calculation unit calculates the coherency in vector direction and magnitude based on the directions and the magnitudes of the flow vectors detected by the vector detection unit.

detecting flow vectors of pixels in an inputted image;
calculating vector coherency based on the detected flow vectors;
computing a deformation characteristic by using the calculated vector coherency, the deformation characteristic being used for deforming a tap shape of a filter used for each of the pixels; and
converting the inputted image based on the computed deformation characteristic.

(11) A program for causing a computer to function as:
a vector detection unit which detects flow vectors of pixels in an inputted image;
a vector-coherency calculation unit which calculates vector coherency based on the flow vectors detected by the vector detection unit;
a deformation-characteristic computation unit which computes a deformation characteristic by using the vector coherency calculated by the vector-coherency calculation unit, the deformation characteristic being used for deforming a tap shape of a filter used for each of the pixels; and
a painterly conversion unit which converts the inputted image based on the deformation characteristic computed by the deformation characteristic computation unit.

The present disclosure contains subject matter related to that disclosed in Japanese Priority Patent Application JP 2012-117386 filed in the Japan Patent Office on May 23, 2012, the entire content of which is hereby incorporated by reference.

What is claimed is:
1. An image processing apparatus comprising:
a vector detection unit which detects flow vectors of pixels in an inputted image;
a vector-coherency calculation unit which calculates vector coherency based on the flow vectors detected by the vector detection unit;
a deformation-characteristic computation unit which computes a deformation characteristic by using the vector coherency calculated by the vector-coherency calculation unit, the deformation characteristic being used for deforming a tap shape of a filter used for each of the pixels; and
a painterly conversion unit which converts the inputted image based on the deformation characteristic computed by the deformation-characteristic computation unit.

2. The image processing apparatus according to claim 1, wherein the deformation-characteristic computation unit includes a brush-size selection computation unit which obtains a tap size of the filter by using the vector coherency calculated by the vector-coherency calculation unit, a stroke selection computation unit which obtains a tap length of the filter by using the flow vectors detected by the vector detection unit and the vector coherency calculated by the vector-coherency calculation unit, and a deformation-characteristic generation unit which generates the deformation characteristic based on the tap size obtained by the brush-size selection computation unit and the tap length obtained by the stroke selection computation unit.

3. The image processing apparatus according to claim 2, wherein the brush-size selection computation unit has a plurality of lookup tables and obtains the tap size of the filter by using one of the lookup tables which is suitable for the inputted image, and wherein the stroke selection computation unit has a plurality of lookup tables and obtains the tap length of the filter by using one of the lookup tables which is suitable for the inputted image.

4. The image processing apparatus according to claim 1, wherein the deformation-characteristic computation unit includes a brush-size selection computation unit which obtains a tap size of the filter by using the vector coherency calculated by the vector-coherency calculation unit, and a deformation-characteristic generation unit which generates the deformation characteristic based on the tap size obtained by the brush-size selection computation unit.

5. The image processing apparatus according to claim 4, wherein the brush-size selection computation unit has a plurality of lookup tables and obtains the tap size of the filter by using one of the lookup tables which is suitable for the inputted image.

6. The image processing apparatus according to claim 1, wherein the deformation-characteristic computation unit includes a stroke selection computation unit which obtains a tap length of the filter by using the flow vectors detected by the vector detection unit and the vector coherency calculated by the vector-coherency calculation unit, and a deformation-characteristic generation unit which generates the deformation characteristic based on the tap length obtained by the stroke selection computation unit.

7. The image processing apparatus according to claim 6, wherein the stroke selection computation unit has a plurality of lookup tables and obtains the tap length of the filter by using one of the lookup tables which is suitable for the inputted image.

8. The image processing apparatus according to claim 1, wherein the vector detection unit detects directions of the flow vectors of the pixels in the inputted image, and wherein the vector-coherency calculation unit calculates coherency in vector direction based on the flow vectors detected by the vector detection unit.

9. The image processing apparatus according to claim 8, wherein the vector detection unit detects the directions and magnitudes of the flow vectors of the pixels in the inputted image, and wherein the vector-coherency calculation unit calculates the coherency in vector direction and magnitude based on the directions and the magnitudes of the flow vectors detected by the vector detection unit.

10. An image processing method, comprising:

detecting flow vectors of pixels in an inputted image;

calculating vector coherency based on the detected flow vectors;

computing a deformation characteristic by using the calculated vector coherency, the deformation characteristic being used for deforming a tap shape of a filter used for each of the pixels; and converting the inputted image based on the computed deformation characteristic.

11. A non-transitory computer readable medium embedded a program for causing a computer to function as:

a vector detection unit which detects flow vectors of pixels in an inputted image;

a vector-coherency calculation unit which calculates vector coherency based on the flow vectors detected by the vector detection unit;

a deformation-characteristic computation unit which computes a deformation characteristic by using the vector coherency calculated by the vector-coherency calculation unit, the deformation characteristic being used for deforming a tap shape of a filter used for each of the pixels; and a painterly conversion unit which converts the inputted image based on the deformation characteristic computed by the deformation characteristic computation unit.

* * * * *